Sept. 2, 1969   M. A. BARRON   3,464,863
DEFERRED ACTION - TYPE BATTERY
Filed Oct. 17, 1967

INVENTOR,
MORTON A. BARRON
ATTORNEYS

United States Patent Office 3,464,863
Patented Sept. 2, 1969

3,464,863
DEFERRED ACTION TYPE BATTERY
Morton A. Barron, Silver Spring, Md., assignor to the United States of America as represented by the Secretary of the Army
Filed Oct. 17, 1967, Ser. No. 676,390
Int. Cl. H01m 21/08
U.S. Cl. 136—114    3 Claims

ABSTRACT OF THE DISCLOSURE

A deferred action type battery for use in a projectile, comprising a stack of electrode plates with separators disposed therebetween to form a plurality of battery cells. The electrolyte is placed in an ampule inserted within the stack and is forced into the battery cells by centrifugal force after the projectile is fired and the ampule is shattered. To prevent leakage, the separators are coated with heat sealing adhesive, and when the assembled stack is heated and put under pressure, the adhesive seals the joints of the stack so as to prevent electrolyte leakage.

---

The invention described herein may be manufactured, used, and licensed by or for the Government for governmental purposes without the payment to me of any royalty thereon.

BACKGROUND OF THE INVENTION

Ordnance fuzes dependent upon electric and electronic devices for operation need a dependable battery to supply the required electric energy. Batteries used in projectile fuzes must be designed to be as small as possible and to have a long storage life. When put into service they must be depended upon to supply the required current and voltage for a predetermined time regardless of environment. This is normally accomplished by using a deferred action type of battery. In this type of battery the electrolyte is maintained out of contact with the plates of the battery and hence the cells are inactive until the battery is called upon to supply power. Normally the electrolyte is contained in a glass vial or ampule which is mounted above a rupturing surface or some other means strong enough to hold the ampule away from the surface during normal handling or accidental dropping of the device, but weak enough to allow the force of inertia or setback, when a projectile containing the battery is fired in a gun, for example, to force the vial into collision with the rupturing surface. The stress produced on the ampule by the impact shatters the glass, and electrolyte is then forced to flow into electrochemical contact with the electrodes by centrifugal action or setback to activate the cells of the battery.

The batteries are normally constructed by using a number of thin plates coated on opposite sides with electronegative and electropositive material. Annular separators are disposed between the plates, forming a cell between the adjacent plates into which electrolyte is placed to form an active battery cell. The complete battery stack normally consists of several layers of plates and separators. Effectively this results in a plurality of cells serially connected. The output of the battery is taken from leads attached to the plates on either end of the stack. The output voltage of the battery can be increased by the addition of more cells.

When the projectile is subjected to an unusually high force of acceleration the ampule is smashed and the electrolyte is forced by centrifugal force or setback to flow into the volume formed by the separators between the plates. An ever present problem in the construction and operation of these batteries is that the electrolyte tends to leak out of the cell area formed by the separators between the plates. This results in electrolyte shorting out the cells of the battery causing excessive noise voltage and short battery life. If used in electric fuzes for artillery projectiles or rockets, excessive noise in the battery output will cause premature detonation of the explosive charge. Another problem which arises when the battery is activated is that seepage of the electrolyte tends to deteriorate the inner edges of the metal electrodes causing erratic performance of the battery.

To solve this problem of electrolyte leakage several solutions have been previously tried. One is to use absorbent material as separators and another is to pot the battery sections in a plastic jacket. Use of absorbent material has not been found to be fully effective in preventing leakage and additionally does not lend any support to the stack. Potting is normally accomplished by injection molding plastic around the inside and outside of the stack. This method is expensive and increases the size and weight of the battery.

It is therefore an object of the invention to provide a deferred-action type battery that is leakproof, self supporting and easy to manufacture.

Another object of this invention is to provide a method for manufacturing deferred action-type batteries which results in a dependable noise-free battery.

Still another object of the invention is to provide a method of manufacture for deferred action-type batteries which simultaneously binds the parts of the battery together and seals against leakage of the electrolyte.

An additional object of the invention is to provide a method of manufacture for deferred action-type batteries which is dependable, simple, inexpensive and uses readily available materials.

SUMMARY OF THE INVENTION

The objects of the invention are accomplished by replacing the standard paper or absorbent material type of separator with a separator composed of paper coated with a heat-sealing adhesive. After the stack of plates and separators is assembled, the stack is put under pressure and heated so that the adhesive softens and flows around the edges of the stack coating all the exposed areas. The adhesive also adheres to the metal plates and when cold the stack of parts is "cemented" together. This results in a stack which is permanently sealed against leaks, has its inner edges protected, and does not necessitate any subsequent operations to seal or protect.

BRIEF DESCRIPTION OF THE DRAWING

The specific nature of the invention, as well as other objects, aspects, uses and advantages thereof, will clearly appear from the following description and from the accompanying drawing, in which.

DESCRIPTION OF A TYPICAL EMBODIMENT

Figure 1:
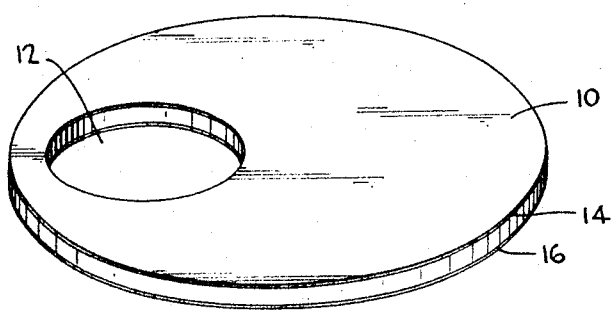
FIGURE 1 is a perspective view of a metal electrode used in the battery of the present invention.

The typical metal electrode 10 shown in FIGURE 1 is cut from plated sheet steel. The steel is coated on one side with lead 16 and on the other side with lead dioxide 14. The plates are similar to those used in the standard lead-lead dioxide-fluoboric acid batteries which have been used in known artillery projectiles. The plate is generally circular in shape with a hole 12 cut in the plate off center and far to one edge. When assembled in the stack, these holes 12 of the several electrode plates line up with similarly situated holes in the separators so that an ampule of acid may be inserted in the stack.

Figure 2:
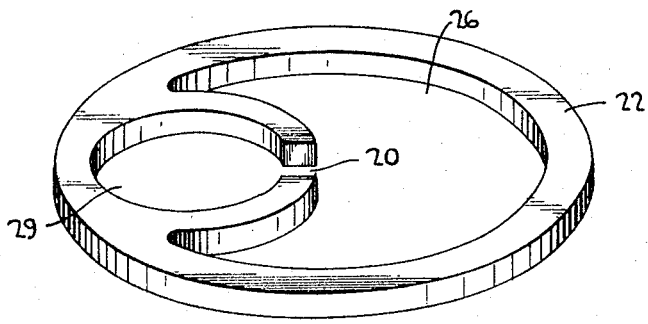
FIGURE 2 is a perspective view of a separator used in the battery of present invention.

In FIGURE 2, the separator 22 is cut to the same outside shape as the electrode 10. The separator 22 is made of paper which is coated and impregnated with a heat-sealing adhesive material such as polyethylene, plastic or epoxy. It has been found that because of cost of purchasing that standard commercial milk carton container paper is well suited for application as the separator. This paper is easily obtainable in large quantities and comes already impregnated and coated on both sides with a layer of polyethylene. Because of a thickness which is slightly larger than desired, the milk carton paper is compressed before use to provide a paper with uniform density and excellent support characteristics. It has been found that good results are obtained when the thickness of the paper, and hence the final separation between the electrodes, is approximately .010 inch. After compression, the paper is cut with a precision die so that the separator will have the configuration shown in FIGURE 2. Area 29 is cut off center and is positioned so that it will coincide with the area 12 of the electrode plates when assembled in the stack. Area 26 is situated so that when the stack is assembled there will be a space between the electrodes. When filled with electrolyte, this area 26 along with the adjacent electrodes, will form an individual battery cell. Fill port 20 is cut in the paper separator between area 29 and area 26 so that when the ampule shatters the acid will be able to flow through the port 20 into the area 26.

Figure 3:
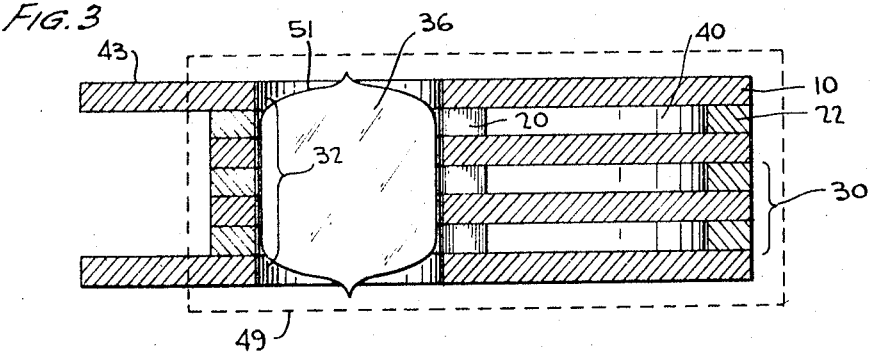
FIGURE 3 is a sectional view of a battery in accordance with the present invention.

The assembled battery stack of FIGURE 3 is composed of layers of metal electrodes 10 and separators 22. The number of layers of electrodes and separators used in a completed battery is dependent upon space limitations and the voltage required to be delivered from the battery. When properly aligned, the elements will form the ampule cavity 36 into which a glass ampule filled with acid or other appropriate electrolyte may be inserted. The electrodes 10 and separators 22 form a plurality of battery cells 40 which are serially connected. When the completed batetry is placed in a projectile which is fired, the ampule will shatter and acid will be forced by the centrifugal force, due to the projectile spin, through the fill ports 20 and into the cells 40, thus activating the battery. In order to allow connection of the battery with outside circuitry, the electrode plates on either end of the battery stack have metal tabs 43 attached which extend outside of whatever casing the stack is placed within (illustrated by dotted line 49).

After the stack is assembled, it is put under pressure and heated to a temperature which will allow the adhesive coating on separators 22 to flow. This flow will coat the outside of the stack 30 with a smooth continuous protective sleeve of heat sealing adhesive. The inside of the ampule cavity 32 will be similarly coated. In addition to preventing electrolyte leakage, the adhesive will act as a binder for the electrodes and separators thereby eliminating the need for any further manufacturing steps with the purpose of cementing the layers of the battery together. There is also no need whatsoever to mold, paint, pot or otherwise protect the electrode edges in the ampule cavity because it is fully protected by the protective film. After cooling the stack may be encased in a suitable housing and the ampule of electrolyte 51 inserted.

When the battery is mounted in the projectile, it will be positioned so the ampule will be nearest to the projectile center. During setback due to the acceleration of firing the ampule shatters and the electrolyte is released and centrifuged into the cells through the fill ports 20. Tests have shown batteries constructed in accordance with the invention are rugged, have long storage life, are useful over wide temperature ranges, have litle noise output and are very inexpensive to manufacture.

It will be apparent that the embodiment shown is only exemplary and that various modifications can be made in construction and arrangement within the scope of the invention as defined in the appended claims.

I claim:
1. A deferred action battery comprising:
 (a) a stack of a plurality of thin electrode plates each having one side coated with electronegative material and the other side coated with electropositive material, with successive plates having electronegative and electropositive sides face-to-face, said plates having an internal opening cut therein,
 (b) separator means disposed between the battery plates and having a plurality of internal openings cut therein including:
  (1) a first internal opening which coincides with said internal opening of the electrode plates,
  (2) a second internal opening to form a space between the electrode plates when the battery is assembled,
  (3) a radial passage between the said first internal opening and second internal opening to form electrolyte entry ports to said space,
 (c) said separator means being coated with a heat sealing adhesive,
 (d) conducting means connected to the electrode plates on either end of the battery stack,
 (e) a breakable container with an electrolyte therein which will shatter when the battery is put under a high force of acceleration, said container placed within the space formed in the battery stack by the internal openings of the electrode plates and the first internal openings of the separator plates.

2. A method of manufacturing a deferred action type of battery comprising the steps of:
 (a) alternately stacking thin battery plates having one side electronegative and the other side electropositive and separators coated with heat sealing adhesive, said plates and separators having;
  (1) inner portions removed therefrom so as to form a cavity into which an electrolyte container may be placed and
  (2) spaces between the electrode plates into which the electrolyte may flow;
 (b) applying heat and pressure to the stack so that the heat sealing adhesive melts and flows around the edges of the stack, said adhesive coating the outside of the stack and preventing electrolyte leakage when the battery is activated.

3. The battery of claim 1 wherein the heat sealing adhesive is polyethylene.

References Cited
UNITED STATES PATENTS

| | | | |
|---|---|---|---|
| 2,847,493 | 8/1958 | Smyth et al. | 136—143 |
| 2,953,622 | 9/1960 | Gray | 136—143 |
| 3,150,010 | 9/1964 | Cleveland | 136—90 |
| 3,156,588 | 10/1964 | Darland | 136—90 |
| 3,162,548 | 12/1964 | Bennett | 136—90 |
| 3,170,822 | 2/1965 | Babcock | 136—90 |
| 3,226,260 | 12/1965 | Drengler | 136—143 |

WINSTON A. DOUGLAS, Primary Examiner

C. F. LE FEVOUR, Assistant Examiner

U.S. Cl. X.R.

136—90